(12) United States Patent
Frenzel et al.

(10) Patent No.: US 9,704,048 B2
(45) Date of Patent: **\*Jul. 11, 2017**

(54) IMAGING SYSTEM FOR A MOTOR VEHICLE, HAVING PARTIAL COLOR ENCODING

(71) Applicant: Continental Automotive GmbH, Hannover (DE)

(72) Inventors: Henryk Frenzel, Regensburg (DE); Thorsten Koehler, Deverling (DE); Stephan Voltz, Happurg (DE); Ulrich Wagner, Langenargen (DE)

(73) Assignee: Continental Automotive GmbH, Hannover (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/636,617

(22) Filed: Mar. 3, 2015

(65) Prior Publication Data

US 2015/0213319 A1 Jul. 30, 2015

Related U.S. Application Data

(63) Continuation of application No. 10/593,840, filed as application No. PCT/EP2005/052080 on May 6, 2005.

(30) Foreign Application Priority Data

May 25, 2004 (DE) .................. 10 2004 025 541
Jun. 1, 2004 (DE) .................. 10 2004 026 591

(51) Int. Cl.
*H04N 9/04* (2006.01)
*H04N 9/64* (2006.01)
(Continued)

(52) U.S. Cl.
CPC .......... *G06K 9/00818* (2013.01); *G02B 5/20* (2013.01); *G06K 9/00798* (2013.01);
(Continued)

(58) Field of Classification Search
CPC ........ G06T 9/00818; H04N 9/04; H04N 9/64; G06K 9/00798; G06K 9/2018
(Continued)

(56) References Cited

U.S. PATENT DOCUMENTS 3,971,065 A 7/1976 Bayer
4,330,797 A 5/1982 Yokokawa et al.
(Continued)

FOREIGN PATENT DOCUMENTS

EP 0 830 267 7/2002
EP 1 418 089 5/2004
(Continued)

OTHER PUBLICATIONS

Gislin Dagnelie, "Visual Prosthetics", Physiology, Bioengineering, Rehabilitation, Springer, Chapter 1, 2011, pp. 3 to 21.
(Continued)

*Primary Examiner* — On S Mung
(74) *Attorney, Agent, or Firm* — W. F. Fasse

(57) ABSTRACT

An imaging system for imaging an environment outside of a motor vehicle combines color-coded pixels and non-color-coded pixels in a single imaging sensor of a camera. Pixel groups each include at least one color-coded pixel and at least two non-color-coded pixels. The pixel groups are arranged in a repeating pattern of partial color encoding.

34 Claims, 5 Drawing Sheets

(51) Int. Cl.
  *G06K 9/20* (2006.01)
  *G06K 9/00* (2006.01)
  *G06T 1/00* (2006.01)
  *G02B 5/20* (2006.01)
  *H04N 5/369* (2011.01)

(52) U.S. Cl.
  CPC .......... *G06K 9/2018* (2013.01); *G06T 1/0007* (2013.01); *H04N 5/369* (2013.01); *H04N 9/04* (2013.01); *H04N 9/64* (2013.01)

(58) Field of Classification Search
  USPC .................................................. 348/113, 148
  See application file for complete search history.

(56) References Cited

U.S. PATENT DOCUMENTS

| | | | |
|---|---|---|---|
| 5,221,963 | A | 6/1993 | Hashimoto et al. |
| 5,398,077 | A | 3/1995 | Cok et al. |
| 5,987,174 | A | 11/1999 | Nakamura et al. |
| 6,173,108 | B1 | 1/2001 | Ohashi |
| 6,320,176 | B1 | 11/2001 | Schofield et al. |
| 6,320,618 | B1 | 11/2001 | Aoyama |
| 6,455,831 | B1 | 9/2002 | Bandera et al. |
| 6,573,490 | B2 | 6/2003 | Hochstein |
| 6,977,683 | B1 * | 12/2005 | Okada ................ H04N 1/648 348/273 |
| 7,259,367 | B2 | 8/2007 | Reime |
| 8,588,920 | B2 | 11/2013 | Naughton |
| 9,270,899 | B1 | 2/2016 | Ivanchenko |
| 9,335,264 | B2 | 5/2016 | Kroekel et al. |
| 2001/0052938 | A1 | 12/2001 | Itoh |
| 2002/0039142 | A1 | 4/2002 | Zhang |
| 2002/0044209 | A1 | 4/2002 | Saito |
| 2002/0081029 | A1 | 6/2002 | Marugame |
| 2003/0001121 | A1 | 1/2003 | Hochstein |
| 2003/0048493 | A1 | 3/2003 | Pontifex et al. |
| 2004/0008410 | A1 | 1/2004 | Stam et al. |
| 2004/0090550 | A1 * | 5/2004 | Park .................. H04N 9/045 348/350 |
| 2004/0091133 | A1 | 5/2004 | Monji |
| 2004/0141057 | A1 | 7/2004 | Pallaro et al. |
| 2005/0146629 | A1 | 7/2005 | Muresan |
| 2006/0050082 | A1 | 3/2006 | Jeffrey |
| 2006/0072319 | A1 | 4/2006 | Dziekan et al. |
| 2006/0145220 | A1 | 7/2006 | Hwang |
| 2006/0215049 | A1 | 9/2006 | Sandini et al. |
| 2007/0159544 | A1 | 7/2007 | Hu |
| 2008/0043099 | A1 | 2/2008 | Stein et al. |
| 2010/0134616 | A1 | 6/2010 | Seger et al. |
| 2012/0038801 | A1 | 2/2012 | Yamada |
| 2012/0200733 | A1 | 8/2012 | Utsugi |
| 2012/0293695 | A1 | 11/2012 | Tanaka |
| 2013/0070109 | A1 | 3/2013 | Gove et al. |
| 2013/0258112 | A1 | 10/2013 | Baksht |
| 2014/0063306 | A1 | 3/2014 | Scott |
| 2014/0354773 | A1 | 12/2014 | Venkataraman et al. |
| 2015/0215550 | A1 | 7/2015 | Frenzel et al. |
| 2016/0080659 | A1 | 3/2016 | Kroekel et al. |

FOREIGN PATENT DOCUMENTS

| | | |
|---|---|---|
| EP | 1 764 835 | 3/2007 |
| JP | 09-035065 A | 2/1997 |
| JP | 11-351862 A | 12/1999 |
| JP | 2002-026304 A | 1/2002 |
| JP | 2004-040409 A | 2/2004 |
| JP | 2004-104646 A | 4/2004 |
| JP | 2004-304706 A | 10/2004 |
| WO | WO 96/38319 | 12/1996 |
| WO | WO 01/70538 | 9/2001 |
| WO | WO 09/27134 | 3/2009 |

OTHER PUBLICATIONS

Robert F. Schmidt et al., "Neuro- und Sinnesphysiologie" ("Neuro- and Sensory Physiology"), Springer Instructional Book, 5$^{th}$ Edition, Chapter 10, 2006, Heidelberg, Germany, pp. 243 to 273, with partial English translation of pp. 265 to 267.
Office Action in U.S. Appl. No. 10/593,840, mailed Apr. 11, 2011, 12 pages.
Office Action in U.S. Appl. No. 10/593,840, mailed Sep. 14, 2011, 14 pages.
Final Office Action in U.S. Appl. No. 10/593,840, mailed Feb. 17, 2012, 17 pages.
Advisory Action in U.S. Appl. No. 10/593,840, mailed May 1, 2012, 6 pages.
USPTO Patent Trial and Appeal Board, Decision on Appeal in U.S. Appl. No. 10/593,840, mailed May 18, 2015, 7 pages.
US Office Action in U.S. Appl. No. 10/593,840, mailed Nov. 23, 2015, 33 pages.
US Office Action in U.S. Appl. No. 14/636,773, mailed Dec. 8, 2015, 16 pages.
US Final Office Action in U.S. Appl. No. 10/593,840, mailed May 31, 2016, 23 pages.
US Final Office Action in U.S. Appl. No. 14/636,773, mailed Jun. 15, 2016, 19 pages.
US Office Action in U.S. Appl. No. 14/636,773, mailed Sep. 15, 2016, 20 pages.

* cited by examiner

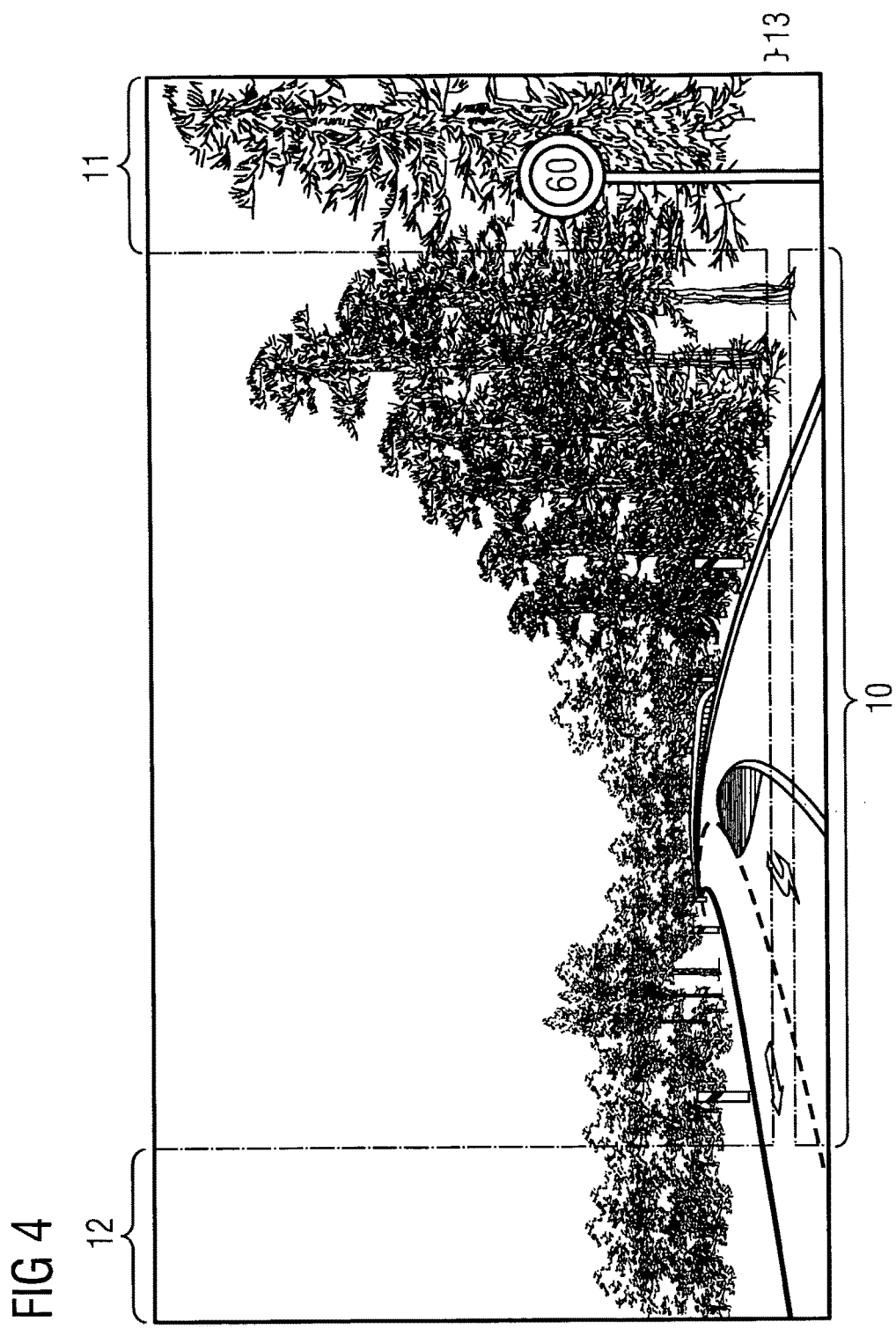

| N | R | N | R |
|---|---|---|---|
| N | N | N | N |
| N | R | N | R |
| N | N | N | N |

| N | R | N | R |
|---|---|---|---|
| N | R | N | R |
| N | R | N | R |
| N | R | N | R |

| R | R | R | R |
|---|---|---|---|
| N | N | N | N |
| R | R | R | R |
| N | N | N | N |

FIG 6

| N | R | N | R |
|---|---|---|---|
| G | N | G | N |
| N | R | N | R |
| G | N | G | N |

US 9,704,048 B2

IMAGING SYSTEM FOR A MOTOR VEHICLE, HAVING PARTIAL COLOR ENCODING

CROSS-REFERENCE TO RELATED APPLICATIONS

This application is a Continuation under 35 USC 120 of U.S. patent application Ser. No. 10/593,840, which was filed on Sep. 22, 2006 as the US National Stage under 35 USC 371 of PCT International Application PCT/EP2005/052080 filed on May 6, 2005. The entire disclosures of the prior applications are incorporated herein by reference. This application is related to a companion Continuation filed as U.S. patent application Ser. No. 14/636,773 on Mar. 3, 2015.

PRIORITY CLAIM

Through the abovementioned prior applications, this application claims the priority under 35 USC 119 of German Patent Application 10 2004 025 541.5 filed on May 25, 2004, and German Patent Application 10 2004 026 591.7 filed on Jun. 1, 2004. The entire disclosures of the foreign priority applications are incorporated herein by reference.

FIELD OF THE INVENTION

The present invention relates to a monitoring unit or imaging system for monitoring, recording or imaging the outside or exterior environment of a motor vehicle, for example in a motor vehicle's direction of travel, including at least one camera system having an image-recording sensor.

BACKGROUND INFORMATION

Intelligent Advanced Driver Assistance Systems (ADAS) will play an increasingly important role in modern motor vehicles of the future. Future vehicles will contain, for example, monitoring units such as camera systems having, for instance, digital CMOS (Complementary Metal-Oxide Semiconductor) or CCD (Charge-Coupled Device) image sensors as aids that monitor, record or image the outside environment, for example in the motor vehicle's direction of travel.

In connection with such image processing systems used in the automotive sector for detecting the driving environment, a pure black/white (B/W), that is to say monochrome, image recording is more advantageous than color image recording for most tasks. However, applications do exist where color information obtained from, for example, the three RGB primary colors red (R), green (G), and blue (B), and/or other colors such as, for instance, yellow (Y) etc., can be important for attaining a higher confidence level of the output vector generated by an image processing system.

An instance thereof is traffic sign recognition, wherein it is possible to recognize, by way of the where applicable, individual color information (R and/or G and/or B and/or other colors such as, for instance, Y etc.), whether the sign concerned is a prohibition sign or a sign giving orders, or one that purely provides information.

Another function is the recognition of colored lane markings, for example, in roadwork or construction areas. Color information is helpful here too, and is necessary to be able, for example, to distinguish between the normal white markings that are no longer valid and the additional yellow lane markings.

Conversely, purely monochrome (B/W) image recording is sufficient for a recognition of objects such as obstacles, other vehicles, bicyclists or other persons, because color information (R, G, B, Y etc.) will as a rule not provide better recognition quality in this context.

SUMMARY OF THE INVENTION

In view of the above, it is an object of one or more embodiments of the invention to provide an improved monitoring unit or imaging system for monitoring, recording or imaging the exterior environment outside of a motor vehicle, especially in the motor vehicle's direction of travel, which monitoring unit includes at least one camera system having an image-recording sensor. It is another object of one or more embodiments of the invention to provide an improved driver assistance system for a motor vehicle, in particular for traffic-sign and/or traffic-lane detection. The invention further aims to avoid or overcome the disadvantages of the prior art, and to achieve additional advantages, as apparent from the present specification. The attainment of these objects is, however, not a required limitation of the claimed invention.

Embodiments of the invention further develop generic monitoring units or imaging systems for imaging the outside environment of a motor vehicle in the direction of travel in that the monitoring unit includes at least one camera system having an image-recording sensor having color coding (R, G, B, Y, . . . ) in partial areas but otherwise monochrome coding (B/W). Embodiments of the present invention thus proceed from an image-recording sensor that is substantially embodied or coded as monochrome (B/W), and additionally has color coding (R and/or G and/or B and/or other colors such as, for instance, Y etc.) in partial areas thereof.

For the purpose of recognizing or assigning specific colors of traffic signs, it is proposed to provide a color coding (R and/or G and/or B and/or other colors such as, for instance, Y etc.) of vertical stripes and/or areas on the right-hand and/or left-hand image edge. Because traffic signs move from the center of the image outward from the perspective of a camera mounted in the front area of a motor vehicle traveling in a straight line, the color of the sign and the basic information associated therewith (prohibition, orders, other information) can be advantageously determined when the sign is located within the color-coded stripes or, as the case may be, areas.

For the purpose of recognizing the e.g. yellow or white color of a lane marking, it is proposed to provide a color coding (R and/or G and/or B and/or other colors such as, for instance, Y etc.) of horizontal stripes and/or areas on the sensor's bottom image edge, preferably in the area where the camera has a view onto the road directly over the hood, particularly in the case of a customary passenger automobile. The camera can, of course, be arranged analogously when the inventive monitoring unit is is employed in a truck or van etc. This area is not absolutely essential for image evaluation with regard to object detection or lane detection, and can thus advantageously be used for color-recognition purposes. Because traffic lanes can be seen from the center/ top of the central image area down to the bottom left-hand or right-hand image area when the camera is mounted on the front of a vehicle traveling in a straight line, then in addition to the traffic lane's position the color can advantageously be determined and made available to an image-processing system.

In order to obtain the desired color information (R and/or G and/or B and/or other colors such as, for instance, Y etc.)

it is proposed to attach a tiny color filter, where applicable specifically accommodated to the application, in front of each individual cell (pixel) of the pertinent stripes or areas.

In a first embodiment, the color-coded stripes and/or areas are embodied as, for example, a single color (R; Y; etc. . . . ). The vertical stripes and/or areas expediently have, for example, a red (R) color coding, and the horizontal stripes and/or areas preferably have a yellow (Y) color coding.

Alternatively or additionally, the color-coded horizontal and vertical stripes and/or areas can be embodied as a combination of two colors (R, G). In particular, vertical stripes and/or areas having red (R) and green (G) color coding have proved useful for increasing the contrast of signs that give orders and are placed in front of trees.

In a further embodiment, for obtaining the desired color information (R, G, B), it is proposed to arrange a tiny color filter in one of the three RGB primary colors red (R), green (G), and blue (B) in front of each individual cell (pixel) of the pertinent stripes or areas, whereby the filters are preferably arranged in the so-called "Bayer pattern".

Another embodiment of the invention further comprises an assistance system having a monitoring unit of the aforementioned type. The monitoring unit's advantages will in this way also come to bear within the scope of an overall system, in particular for traffic-sign and/or traffic-lane detection. The ratio of monochrome coding (B/W) to partial color coding is therein preferably 80:20%. Depending on the focus of the specific application, the partially color-coded areas can also occupy 25% or up to 40% of the sensor surface.

The main advantage of a monitoring unit according to an embodiment of the invention for imaging the outside environment in a motor vehicle's direction of travel or, as the case may be, of an assistance system for motor vehicles including such a monitoring unit, having a partially color-coded (R and/or G and/or B and/or other colors such as, for instance, Y etc.) camera is that all relevant data for imaging or detecting driving environments can for the first time be obtained using just one camera. Owing to the camera's substantially monochrome (B/W) is image recorder, there will be no constraints on sensitivity so that reliable evaluation will be ensured even in poor light conditions. The color coding (R and/or G and/or B and/or other colors such as, for instance, Y etc.) in the sensor's edge area will not compromise those applications for which the purely monochrome (B/W) image is more advantageous.

By contrast, the color coding (R and/or G and/or B and/or other colors such as, for instance, Y etc.) having vertical stripes and/or areas on the right-hand and/or left-hand edge of the sensor's image field will provide reliable information about the n color (R, G, B, Y, . . . ) of traffic signs. The color coding (R, G, B, Y, . . . ) in the bottom image area will provide reliable information about the color of lane markings.

A single camera can thus be used for all relevant applications, and that will advantageously save costs and mounting or installation space.

BRIEF DESCRIPTION OF THE DRAWINGS

In order that the invention may be clearly understood, it will now be described in connection with example embodiments thereof, with reference to the accompanying drawings, wherein:

FIG. 4 is the exemplary image according to FIG. 1 showing the exterior scene that has been partially color-coded according to FIG. 2; and FIGS. 5A, 5B, 5C and 6 are respective further examples of different color-filter distributions of the image recorder or sensor of a monitoring unit's camera.

DETAILED DESCRIPTION OF PREFERRED EXAMPLE EMBODIMENTS AND OF THE BEST MODE OF THE INVENTION

Figure 1:
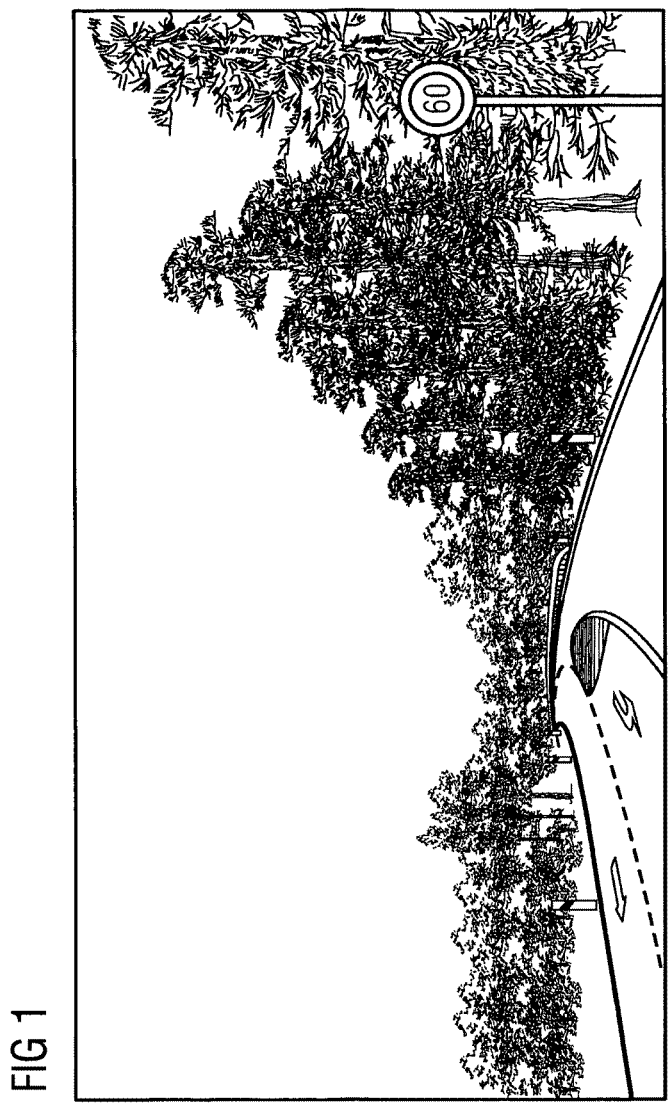
FIG. 1 is an exemplary image of an exterior scene outside a motor vehicle as imaged in monochrome (B/W)

FIG. 1 shows an exemplary image, shown in monochrome, of an exterior scene outside a motor vehicle. What is disadvantageous about such a black/white (B/W) image recording is the lack of color information that could be obtained from, for example, the three primary colors red (R) and/or green (G) and/or blue (B) and/or other colors such as, for instance, yellow (Y) etc.

Such color information (R, G, B, Y, . . . ) can be important for attaining a higher confidence level of the output vector generated by an image processing system, in particular for the recognition of traffic signs, wherein by way of the color information (R and/or G and/or B and/or other colors such as, for instance, Y etc.) it can be recognized whether the sign is a prohibition sign or an affirmative requirement sign giving orders, as in the case of the speed-limit sign on the right of the image section shown FIG. 1, or an informational sign that purely provides information (not shown).

A further function is the recognition of colored lane markings associated with roadworks or construction areas. In this regard, it is helpful and necessary to distinguish between the normal white markings, which are no longer valid, and the additional yellow lane markings that apply in the roadwork or construction area.

Conceivable solutions featuring an exclusively color-coded (R, G, B, Y, . . . ) image recorder or sensor are not only more computationally intensive and thus more costly, but also have the disadvantage that monochrome (B/W) images are more favorable or advantageous for a number of outside applications, in particular for object detection of obstacles, other vehicles, and bicyclists, persons and the like, or night-time applications.

To resolve this conflict of opposed requirements, one or more embodiments of the present invention propose the use, in a monitoring unit, of for example a specially embodied CCD sensor 10 having color coding (R, G, B, Y, . . . ) in partial areas 11, 12, 13, but otherwise having monochrome coding (B/W). In other words an embodiment of the present invention proceeds from a sensor 10 that is embodied or coded substantially as monochrome (B/W), and that additionally has color coding (R and/or G and/or B and/or other colors such as e.g. Y, etc.) in partial areas. That could be achieved by, for instance, a color coding (R, G, B, Y, . . . ) of vertical stripes (not shown) or areas on the right-hand image edge 11 and left-hand image edge 12, and would be helpful, for example, for assigning the correct color (R, G, B, Y, . . . ) to traffic signs. Because the traffic signs move from the center of the image outward, from the perspective of a camera mounted in the front area of a motor vehicle traveling in a straight line, the color (R, G, B, Y, . . . ) of the sign can be determined at the time when the sign is located within the color-coded (R, G, B, Y, . . . ) stripes or areas 11, 12.

An expedient approach for recognizing the color of the traffic lane (yellow or white, for example) is also to provide color coding, in particular yellow (Y) coding, in the bottom area 13 of the sensor 10, preferably in the area where the camera has a view onto the road directly over the hood in the case of a customary passenger automobile. This area is not absolutely essential for an image evaluation with regard to object detection or lane detection, and can thus be used for color-recognition (Y). Because traffic lanes can be seen from the center/top of the central image area down to the bottom left-hand and right-hand image area when the camera is mounted on the front of a vehicle traveling in a straight line, then in addition to the position of the traffic lane, also the color can be determined and made available to the image-processing system. This feature is of course not restricted to motor vehicles having a hood, but rather can be realized analogously when the inventive monitoring unit is employed in particular in a truck or van etc.

Especially also in the case of night-vision applications, the highest possible sensitivity is necessary across the entire, which is to say unfiltered, wavelength range, including the near infrared. Because, however, for this a much smaller detection angle generally has to be detected, it suffices to provide a smaller central area without color coding.

Figure 2:
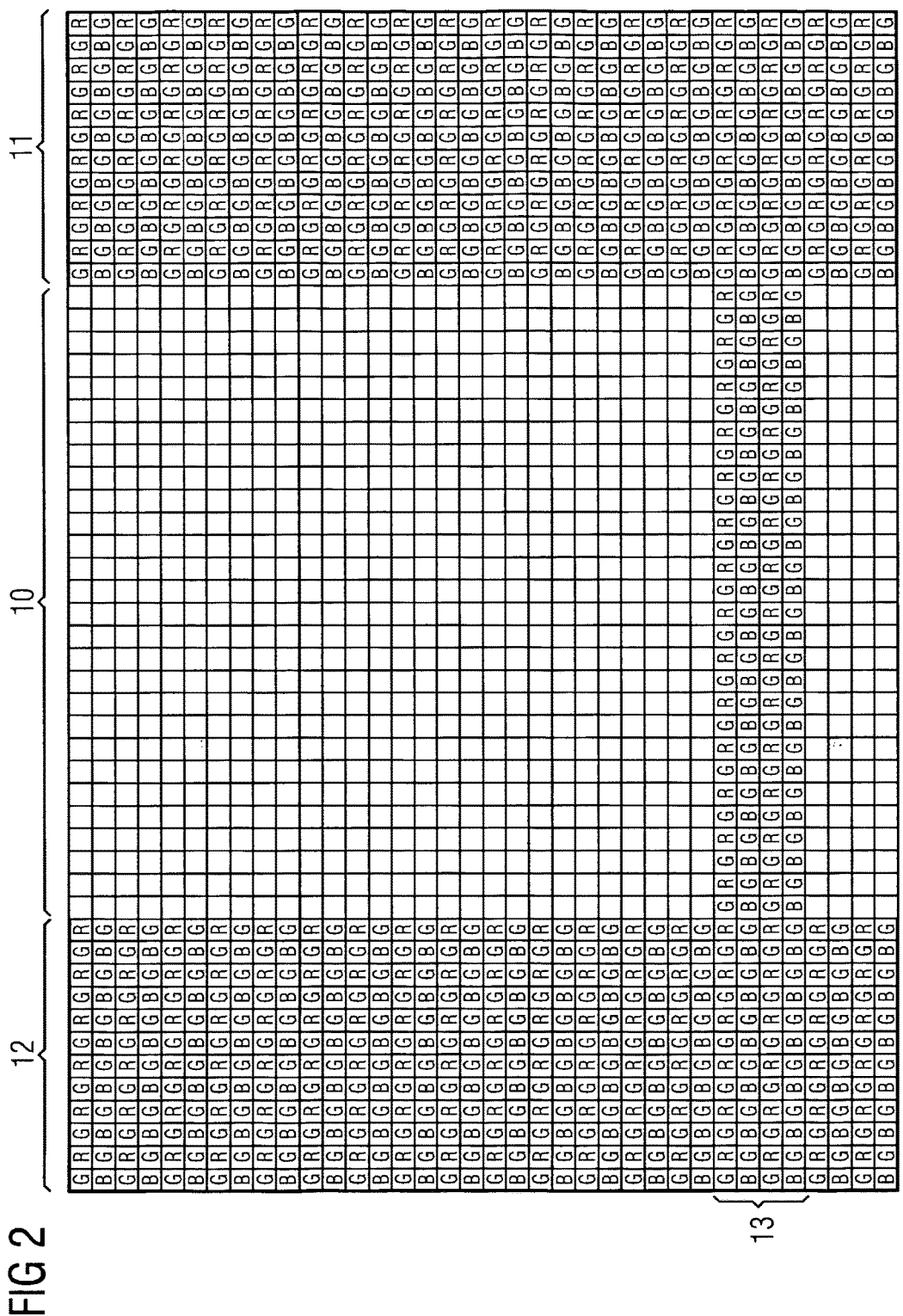
FIG. 2 is a schematic sketch of a possible color-filter distribution (R, G, B) of the image recorder or sensor of a monitoring unit's camera.

FIG. 2 is a schematic sketch of a possible color-filter distribution (R, G, B) of the image sensor 10 of a monitoring unit's camera. The light-sensitive cells of a non color-coded (N) CCD sensor 10 in the monitoring unit's digital camera normally only detect or register brightness values. In order to obtain color information (R, G, B, Y, . . . ), a tiny color filter is to be attached in front of each individual sensor cell for example in one of the three RGB primary colors red (R), green (G), and/or blue (B), and/or another color such as, for instance, yellow (Y) etc. Filters constructed from primary colors are usually attached in the arrangement R-G-R-G and, in the next row, G-B-G-B, which in this arrangement produce the so-called "Bayer pattern".

Figure 3:
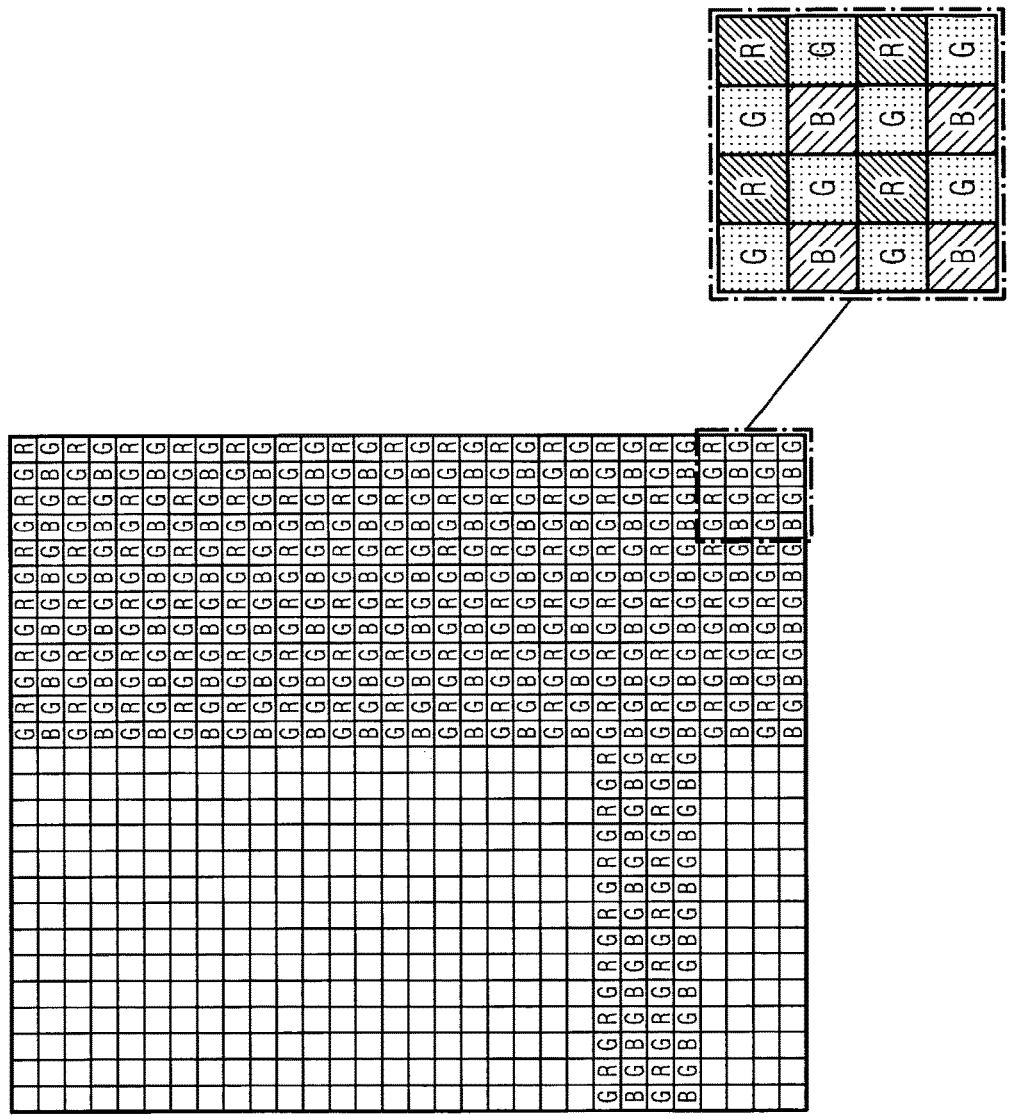
FIG. 3 shows an enlarged portion of the color-filter distribution according to FIG. 2.

FIG. 3 shows an enlarged cut-out portion of a color-filter distribution (R, G, B) according to FIG. 2 arranged as a Bayer pattern. It can clearly be seen how each CCD element only supplies the information for a single color component, so that the adjacent pixels accordingly have to be used for calculating the actual color. This process is referred to as "color interpolation".

Color information useful in the context of road traffic can be obtained within the stripes or areas 11, 12, 13 of the sensor 10 that are coded as a Bayer pattern, by means of such color interpolations, and can thus be made available to an image-processing system.

The corresponding exemplary image according to FIG. 1 showing an exterior scene that has been partially color-coded according to FIG. 2 is shown in FIG. 4.

The color information does not necessarily have to consist of the three primary colors. It is also possible only to use single color filters such as, for instance, red (R) for signs giving orders or yellow (Y) for lane markings associated with, for example, roadworks or construction areas. Combinations of red (R) and green (G) color filters or other color filters specially adapted to the application have also proved useful for increasing the contrast of signs that give orders and are placed in front of trees. Such color filters can advantageously also be arranged is spaced apart from one another, being located, for example, on every other pixel in a row and/or column, i.e. in any desired combination with non-coded (N) pixels or pixels coded in another color or where applicable specially adapted color filters.

Arrangements that offer this type of advantage and further examples of color coding, which can be used instead of the "Bayer pattern", are shown in FIGS. 5 and 6.

FIGS. 5A, 5B and 5C clearly show how only every other pixel in a row or a column, and/or in every other row and every other column, has been provided with a red color filter (R), for example for recognizing signs giving orders. Namely, FIG. 5A shows alternate pixels in every second row and every second column coded for red (R), with the other pixels non-color-coded (N). Thus in FIG. 5A, in each 2×2 pixel group of four pixels only one pixel is color coded, and the pixel groups are oriented and arranged relative to one another so that the color-coded pixels are all located in alternate rows and alternate columns, and there are alternate rows and alternate columns consisting of only non-color-coded pixels. In FIG. 5B, each 2×2 pixel group has two color-coded pixels and two non-color-coded pixels, and the pixels and the pixel groups are oriented and arranged relative to one another so that there are columns of color-coded pixels alternating with columns of non-color-coded pixels. FIG. 5C is similar to FIG. 5B but rotated by 90° so that there are rows of color-coded pixels alternating with rows of non-color-coded pixels.

FIG. 6 shows the advantageous embodiment of a combination of two colors. Instead of R-G-R-G and in the next row G-B-G-B as in the case of the "Bayer pattern", color filters are used in the pattern R-N-R-N and in the next row N-G-N-G, with N signifying no color coding. The pixels are arranged in repeating 2×2 pixel groups, which are arranged and oriented relative to one another so that each row and each column of pixels respectively has color-coded pixels alternating with non-color-coded pixels.

The main advantage of a partially color-coded camera is that all relevant data for imaging or recording driving environments can be obtained using just one camera. Owing to the camera's substantially monochrome (B/W) image sensor there is no constraint or limitation on the sensitivity so that a reliable evaluation will be ensured even in poor light conditions. The color coding (R, G, B, Y, . . . ) in defined edge areas 11, 12, 13 of the sensor 10 will not compromise such applications for which the purely monochrome (B/W) image is more favorable. By contrast, the color coding (R, G, B, Y, . . . ) having vertical stripes on the left-hand image edge 11 and the right-hand image edge 12 of the sensor's image field will provide reliable information about the color (R, G, B, Y, . . . ) of traffic signs, and the color coding (R, G, B, Y, . . . ) in the bottom image area 13 will provide reliable information about the color of traffic lanes.

Thus, a single camera can be used for all applications, and that will advantageously save costs and mounting or installation space.

The present invention is thus especially suitable for implementation in an assistance system for motor vehicles, in particular for traffic-sign and/or traffic-lane detection. It will advantageously increase road-traffic safety not only in combination with existing assistance systems for motor vehicles such as blind-spot detection, lane departure warning (LDW), lane monitoring, night vision, etc.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims. The abstract of the disclosure does not define or limit the claimed invention, but rather merely abstracts certain features disclosed in the application.

What is claimed is:

1. An imaging system for imaging an area of an environment outside of a motor vehicle, comprising a camera arrangement that comprises an imaging sensor having photosensitive pixels arranged in plural pixel rows that extend in a row direction and plural pixel columns that extend in a column direction, wherein said photosensitive pixels include color-coded pixels and non-color-coded pixels arranged in 2×2 pixel groups that each respectively consist of four said photosensitive pixels including at least one said color-coded pixel and at least two said non-color-coded pixels configured in two said pixel rows and two said pixel columns, wherein said 2×2 pixel groups are arranged adjacent one another in said row direction and in said column direction to form a repeating pattern of said 2×2 pixel groups repeating in said row direction and in said column direction to cover an area of said imaging sensor with plural rows and plural columns of said 2×2 pixel groups in said repeating pattern, and wherein said color-coded pixels alternate with said non-color-coded pixels in said row direction and/or in said column direction, in said repeating pattern over said area of said imaging sensor.

2. The imaging system according to claim 1, wherein each said 2×2 pixel group respectively consists of one said color-coded pixel and three said non-color-coded pixels.

3. The imaging system according to claim 2, wherein said 2×2 pixel groups are oriented and arranged relative to one another so that alternate ones of said pixel rows and alternate ones of said pixel columns in said repeating pattern consist of only said non-color-coded pixels.

4. The imaging system according to claim 2, wherein all of said color-coded pixels of all of said 2×2 pixel groups are all coded for a same single color.

5. The imaging system according to claim 1, wherein each said 2×2 pixel group respectively consists of two said color-coded pixels and two said non-color-coded pixels.

6. The imaging system according to claim 5, wherein said two color-coded pixels and said two non-color-coded pixels in each said 2×2 pixel group are oriented and arranged relative to one another, and said 2×2 pixel groups are oriented and arranged relative to one another, so that alternate ones of said pixel rows or alternate ones of said pixel columns in said repeating pattern consist of only said non-color-coded pixels.

7. The imaging system according to claim 5, wherein said two color-coded pixels and said two non-color-coded pixels in each said 2×2 pixel group are oriented and arranged relative to one another, and said 2×2 pixel groups are oriented and arranged relative to one another, so that said color-coded pixels alternate with said non-color-coded pixels in each one of said pixel rows and each one of said pixel columns in said repeating pattern.

8. The imaging system according to claim 5, wherein all of said color-coded pixels of all of said 2×2 pixel groups are coded for a same single color.

9. The imaging system according to claim 5, wherein said two color-coded pixels of each one of said 2×2 pixel groups are respectively coded for two colors different from one another.

10. The imaging system according to claim 9, wherein said two colors are red and green.

11. The imaging system according to claim 9, wherein said two colors are red and yellow.

12. The imaging system according to claim 1, wherein all of said color-coded pixels of all of said 2×2 pixel groups are coded for a red color.

13. The imaging system according to claim 1, wherein a ratio of said non-color-coded pixels to said color-coded pixels ranges from 60:40 to 80:20.

14. The imaging system according to claim 1, wherein a ratio of said non-color-coded pixels to said color-coded pixels is 75:25.

15. The imaging system according to claim 1, wherein a ratio of said non-color-coded pixels to said color-coded pixels is 50:50.

16. The imaging system according to claim 1, wherein said area of said imaging sensor covered by said repeating pattern of said 2×2 pixel groups is a first partial area of a photosensitive sensor surface of said imaging sensor, said imaging sensor further includes additional pixels that are photosensitive and that cover a second partial area of said photosensitive sensor surface, and said additional pixels are not arranged according to said repeating pattern.

17. The imaging system according to claim 16, wherein said additional pixels are not color-coded.

18. The imaging system according to claim 16, wherein said first and second partial areas together cover all of said photosensitive sensor surface, and wherein said first partial area has an H-shaped configuration including a first plurality of said 2×2 pixel groups forming said repeating pattern in plural columns of said 2×2 pixel groups along a first side edge of said photosensitive sensor surface, a second plurality of said 2×2 pixel groups forming said repeating pattern in plural columns of said 2×2 pixel groups along a second side edge of said photosensitive sensor surface opposite said first side edge, and a third plurality of said 2×2 pixel groups forming said repeating pattern in plural rows of said 2×2 pixel groups extending from said first plurality of said 2×2 pixel groups to said second plurality of said 2×2 pixel groups.

19. An imaging system for imaging an area of an environment outside of a motor vehicle, comprising an imaging sensor having photosensitive pixels including color-coded pixels and non-color-coded pixels arranged in 2×2 pixel groups that each consist of one or two of said color-coded pixels and respectively three or two of said non-color-coded pixels, wherein said 2×2 pixel groups are arranged adjacent one another to form a repeating pattern of said 2×2 pixel groups covering an area of said imaging sensor, wherein all of said color-coded pixels of all of said 2×2 pixel groups are coded for a same single color or are respectively coded for two colors that are different from one another, and wherein said color-coded pixels alternate with said non-color-coded pixels in a row direction and/or in a column direction of said photosensitive pixels, in said repeating pattern over said area of said imaging sensor.

20. The imaging system according to claim 19, wherein each one of said 2×2 pixel groups respectively consists of one of said color-coded pixels and three of said non-color-coded pixels.

21. The imaging system according to claim 19, wherein each one of said 2×2 pixel groups respectively consists of two of said color-coded pixels and two of said non-color-coded pixels.

22. The imaging system according to claim 19, wherein said area of said imaging sensor covered by said repeating pattern of said 2×2 pixel groups is a first partial area of a photosensitive sensor surface of said imaging sensor, and said imaging sensor further has additional pixels that are photosensitive and that are arranged differently from said repeating pattern in a second partial area of said photosensitive sensor surface of said imaging sensor distinct from said first partial area.

23. The imaging system according to claim 22, wherein said additional pixels are not color-coded.

24. The imaging system according to claim 21, wherein said two color-coded pixels and said two non-color-coded pixels in each said 2×2 pixel group are oriented and arranged relative to one another, and said 2×2 pixel groups are oriented and arranged relative to one another, so that alternate rows or alternate columns of said photosensitive pixels in said repeating pattern consist of only said non-color-coded pixels.

25. The imaging system according to claim 21, wherein said color-coded pixels alternate with said non-color-coded pixels in said row direction and in said column direction of said photosensitive pixels in said repeating pattern.

26. The imaging system according to claim 25, wherein said two color-coded pixels of each one of said 2×2 pixel groups are respectively coded for said two colors that are different from one another.

27. The imaging system according to claim 26, wherein one of said two colors is red.

28. The imaging system according to claim 26, wherein said two colors are red and green.

29. The imaging system according to claim 26, wherein said two colors are red and blue.

30. The imaging system according to claim 26, wherein said two colors are green and blue.

31. The imaging system according to claim 9, wherein one of said two colors is red.

32. The imaging system according to claim 9, wherein said two colors are red and blue.

33. The imaging system according to claim 9, wherein said two colors are green and blue.

34. An image sensor comprising light-sensitive pixels including color pixels and monochrome pixels covering an area of the image sensor, wherein:
  the color pixels include first color pixels that are color-coded to be sensitive to a first color, and second color pixels that are color-coded to be sensitive to a second color different from the first color,
  the monochrome pixels are not color-coded, and
  the light-sensitive pixels are arranged in a checkerboard pattern in which the color pixels alternate with the monochrome pixels in each row along a row direction and in each column along a column direction, and in which the first color pixels alternate with the second color pixels in two diagonal directions that extend obliquely to the row direction and the column direction.

* * * * *